US006789696B2

(12) United States Patent
Amatsu et al.

(10) Patent No.: US 6,789,696 B2
(45) Date of Patent: Sep. 14, 2004

(54) MULTI-CONNECTED AMPOULES DISPENSING APPARATUS

(75) Inventors: Toshihiro Amatsu, Toyonaka (JP); Reiji Kitagawa, Toyonaka (JP)

(73) Assignee: Yuyama Mfg. Co., Ltd., Osaka (JP)

( * ) Notice: Subject to any disclaimer, the term of this patent is extended or adjusted under 35 U.S.C. 154(b) by 100 days.

(21) Appl. No.: 10/270,677

(22) Filed: Oct. 16, 2002

(65) Prior Publication Data

US 2003/0075553 A1 Apr. 24, 2003

(30) Foreign Application Priority Data

Oct. 19, 2001 (JP) ....................................... 2001-322073

(51) Int. Cl.[7] ....................................... B65G 5/00

(52) U.S. Cl. ......................... 221/237; 221/213; 221/277

(58) Field of Search ................................ 221/236, 237, 221/231, 277, 279, 289, 297, 299, 213

(56) References Cited

U.S. PATENT DOCUMENTS 3,165,231 A * 1/1965 Heiser ........................ 221/115
3,677,383 A * 7/1972 Lamb ....................... 193/35 A
4,768,680 A * 9/1988 Mehlan et al. .............. 221/123
5,799,823 A * 9/1998 Feltrin ........................ 221/298
5,862,942 A * 1/1999 Yuyama et al. ............... 221/25
6,220,450 B1 * 4/2001 Weeder et al. .............. 209/509
6,378,729 B1 * 4/2002 Kodama ..................... 221/196
6,561,380 B1 * 5/2003 Suzuki ....................... 221/266

FOREIGN PATENT DOCUMENTS

JP 8-243146 9/1996

* cited by examiner

*Primary Examiner*—Richard Ridley
(74) *Attorney, Agent, or Firm*—Wenderoth, Lind & Ponack, L.L.P.

(57) ABSTRACT

The present invention provides a multi-connected ampoules dispensing apparatus which is compact and have a high operation reliability. The dispensing portion 3 comprises a pair of rotors 8*a*, 8*b* each of which has a substantially C shape of cross section and is formed with a cutting edge 10 on one side edge. The rotors 8*a*, 8*b* are disposed in a vertical direction with a predetermined distance. The rotors 8*a*, 8*b* are synchronized to rotate from a receiving position to a cut-off position and return to the receiving position, whereby in the receiving position the rotors 8*a*, 8*b* can receive the first ampoule 4*a* and then cut off and dispense it. The second ampoule 4*b* adjacent to the first ampoule 4*a* is positioned in the waiting position by the positioning member 9 synchronized with the dispensing portion 3.

5 Claims, 7 Drawing Sheets

MULTI-CONNECTED AMPOULES DISPENSING APPARATUS

BACKGROUND OF THE INVENTION

The present invention relates to a multi-connected ampoules dispensing apparatus for cutting off and dispensing ampoules one by one from a plural sets of multi-connected ampoules.

Conventionally, a multi-connected ampoule 4 as shown in FIG. 8 has been known to person skilled in the art. The multi-connected ampoule comprises a plurality of ampoules of synthetic resin connected by cut-off portions each having notch which can be easily cut off. There has been proposed a various kinds of multi-connected ampoule dispensing apparatus for cutting off and dispensing ampoules one by one from such plural sets of multi-connected ampoules. For example, there has been known an apparatus in which a plurality of five-connected ampoules are contained in a vertically stacked state in a storage container and cut off and dispensed one by one by means of a conveyor belt disposed under the lowermost five-connected ampoule, a hold means disposed above the conveyor belt for holding the five-connected ampoules and rotors disposed at the downstream end of the conveyor belt (for example, Japanese patent Laid-open publication No. 8-243146).

In the above-described multi-connected ampoule dispensing apparatus, however, it is necessary to form recesses, in which the ampoules are positioned, on the whole range of the outer surface of each rotor, which necessitate making the rotors themselves larger. Moreover, the rotors must be disposed in a vertical direction. In addition, the ampoule adjacent to the ampoule to be cut off is guided by the rotor and guide plates which protrude laterally from the storage container. Therefore, it is inevitable to enlarge the dispensing portion of the apparatus.

The above-described apparatus is simply constructed to continuously cut off the multi-connected ampoule delivered by the belt conveyor using the rotors. Therefore, it is not possible to decide whether or not the ampoule has been surely cut off and whether or not any jam or so occur, causing a problem on operation reliability.

SUMMARY OF THE INVENTION

The present invention has been developed to substantially eliminate the above-described disadvantages.

It is therefore an object of the present invention to provide a multi-connected ampoules dispensing apparatus which is compact and have a high operation reliability.

In order to attain the aforementioned objects, there is provided a multi-connected ampoule dispensing apparatus, comprising:

feed means for feeding a multi-connected ampoule comprising a plurality of ampoules of synthetic resin, the feed means feeding the first ampoule from a waiting position to a dispensing position and feeding a second ampoule adjacent to the first ampoule to the waiting position;

dispensing means for cutting off and dispensing ampoules in order from a first ampoule positioned at one end of the multi-connected ampoule, the dispensing means comprising a pair of rotors each of which has a substantially C shape of cross section and is formed with a cutting edge on one side edge, the rotors being disposed in a vertical direction with a predetermined distance, the rotors being synchronized to rotate from a receiving position, in which the cutting edges separate from each other, to a cut-off position, in which the cutting edges close with each other, and return to the receiving position, whereby in the receiving position the rotors can receive the first ampoule positioned at the dispensing position and then in the cut-off position cut off the first ampoule to dispense it; and positioning means for positioning the second ampoule in the waiting position when the dispensing means cut off the first ampoule, the positioning means being synchronized with the dispensing means.

According to the above construction, the first ampoule positioned at one end of the multi-connected ampoule can be surely received by the rotors which are rotated in the receiving position. When the rotors are rotated, the positioning means is operated in a synchronized manner with the rotors, whereby the second ampoule can be positioned in the waiting position. Therefore, when the rotors are rotated to the cut-off position to cut off the first ampoule, the positioning means prevents the second ampoule from being shifted, whereby it never happens that the cut-off operation is obstructed.

Preferably, the feed means may comprise a belt conveyor, and wherein the positioning means comprises a press lever which positions the second ampoule in the waiting position together with the belt conveyor and the upper rotor when the rotors rotate to the cut-off position. Thus, it is possible to prevent the shift of the second ampoule with a simple construction without increasing the number of the parts.

Preferably, the apparatus may further comprise ampoule position detecting means for detecting whether or not the first ampoule passes through the waiting position, and whereby when the ampoule position detecting means detects that the first ampoule has passed through the waiting position, the rotors are rotated so that the positioning means positions the second ampoule in the waiting position and the cutting edges cut off the first ampoule. Thus, it is possible to surely cut off only the first ample.

Preferably, when the ampoule position detecting means can not detect that the first ampoule has passed through the waiting position in spite that the feed means feeds the multi-connected ampoule, the rotation direction of the rotors and the feed direction of the feed means are reversed. Thus, it is possible to properly solve jam of the ampoule and so on and promptly return to the dispensing operation.

Preferably, the apparatus may further comprise rotor position detecting means for detecting whether or not the rotors is positioned in the receiving position, and whereby when the rotor position detecting means can not detect that the rotors rotate from the receiving position and return to the receiving position again, the rotation direction of the rotors and the feed direction of the feed means are reversed. Thus, it is possible to easily take out the jammed ampoule.

BRIEF DESCRIPTION OF THE DRAWINGS

Further objects and advantages of the present invention will become clear from the following description taken in conjunction with the preferred embodiments thereof with reference to the accompanying drawings, in which.

DETAILED DESCRIPTION OF THE PREFERRED EMBODIMENTS

Figure 1:
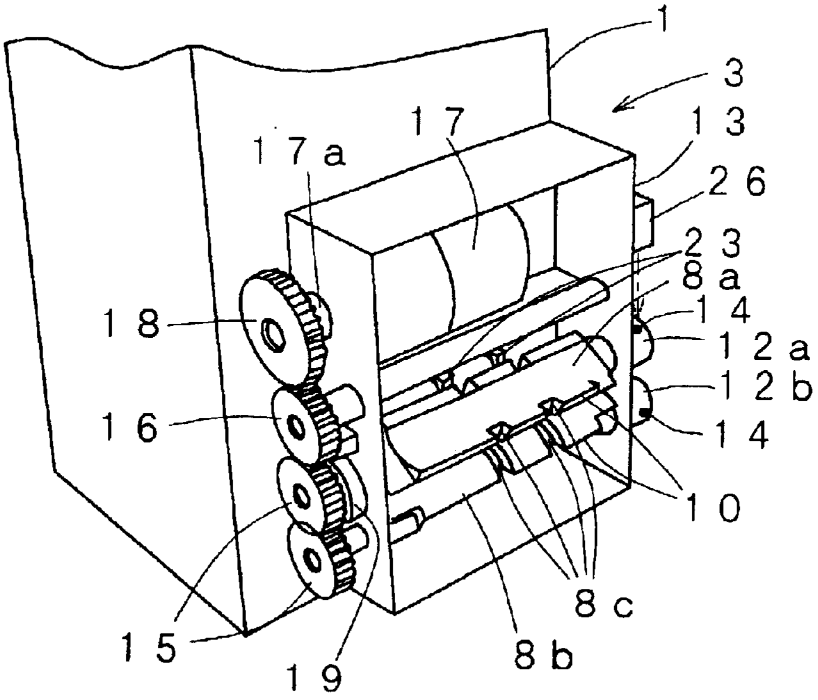
FIG. 1 is a schematic perspective view of a multi-connected ampoules dispensing apparatus according to an embodiment of the present invention.
Figure 2:
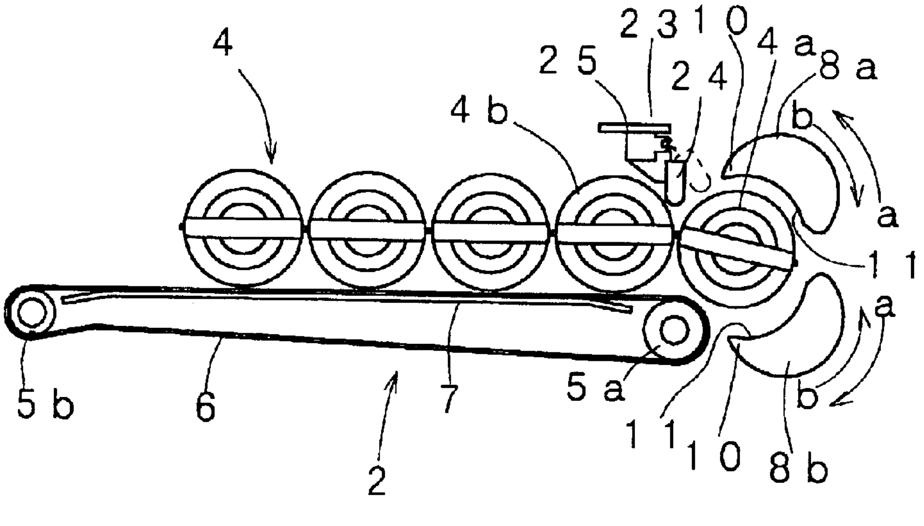
FIG. 2 is a schematic view showing a state of feeding out the multi-connected ampoule by the belt conveyor, a state of operating the ampoule detecting sensor, and a state of operating the rotors.

FIGS. 1 and 2 show a multi-connected ampoules dispensing apparatus according to an embodiment of the present invention. The multi-connected ampoules dispensing apparatus has a storage container 1, a belt conveyor 2 as a feed means disposed beneath the storage container 1, an ampoule dispensing portion 3 disposed on the side surface of lower portion of the storage container 1.

In the storage container 1, a plurality of multi-connected ampoules 4 are stacked in a vertical direction. Hereinafter, among the plurality of ampoules consisting multi-connected ampoules 4, an ampoule positioned at one end and cut-off first is referred to as a first ampoule 4*a*, while an ampoule adjacent to the first ampoule 4*a* is referred to as a second ampoule 4*b*.

The belt conveyor 2 comprises a belt 6 which runs around a pair of rollers 5*a*, 5*b* disposed with a predetermined distance. Beneath the upper running portion of the belt 6 is disposed a guide plate 7.

Figure 4:
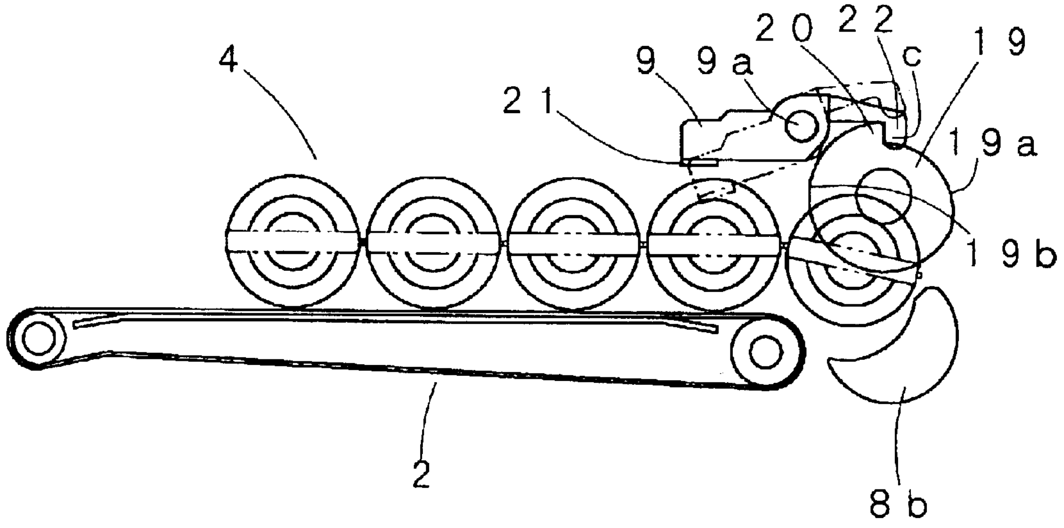
FIG. 4 is a schematic view showing a state of feeding out the multi-connected ampoule by the belt conveyor, a state of operating the cam, a state of operating the press lever.

The ampoule dispensing portion 3 has a pair of rotors 8*a*, 8*b* as a dispensing means which are disposed vertically with a predetermined distance and a press lever 9 as a positioning means which is synchronized with the pair of rotors 8*a*, 8*b* as shown in FIG. 4.

Each of the rotors 8*a*, 8*b* have a substantially C-shape of cross section. On one side edge of the rotor is formed a cutting edge 10. The curved inner and outer surfaces extend toward the other side edge from the cutting edge 10. On the outer surface are formed escape grooves 8*c* to avoid interfering with protrusions 24 of ampoule position detecting sensors 23 which will be explained hereinafter. The inner surface constitutes a receiving surface 11 which is possible to receive the first ampoule 4*a*. The rotors 8*a*, 8*b* have rotation shafts 12*a*, 12*b* respectively. Each of the rotation shafts 12*a*, 12*b* is rotatably supported on a frame 13 which has a rectangular cross section and protrudes from the side surface of lower portion of the storage container 1. In FIG. 2, a direction of arrow “a” is a forward rotation and a direction of arrow “b” is a reverse rotation.

Figure 3A:
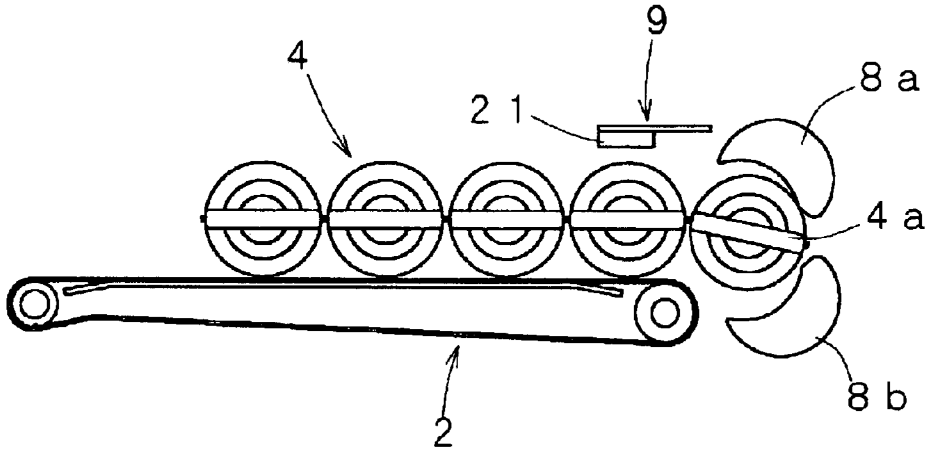
FIGS. 3A–3C are schematic views showing a state of feeding out the multi-connected ampoule by the belt conveyor, a state of operating the rotors, a state of operating the press lever.

The outer surface of the one end of each of the rotation shafts 12*a*, 12*b* is provided with a detected portion (permanent magnet) 14 so that the rotation position of each of the rotors 8*a*, 8*b* can be detected by the rotor position detecting sensor 26. Thus, the rotors 8*a*, 8*b* can be rotated from a receiving position (FIG. 3A), in which the cutting edges 10 separate from each other and the receiving surfaces 11 can receive the first ampoule 4*a*, to a cut-off position (FIG. 3B), in which the cutting edges 10 close with each other and can cut-off the first ampoule 4*a* from the multi-connected ampoule 4, and returned to the receiving position after dispensing the cut-off first ampoule 4*a* (FIG. 3C). When the rotors 8*a*, 8*b* are rotated in the receiving position (FIG. 3A), the multi-connected ampoule 4 is fed out by the belt conveyor 2 so that the first ampoule 4*a* can come into contact with the receiving surfaces 11 of the rotors 8*a*, 8*b*, whereby the first ampoule 4*a* is positioned in a dispensing position.

The other ends of the rotation shafts 12*a*, 12*b* are fixed with rotor gears 15. The rotor gears 15 engages with each other so that the rotor 8*a*, 8*b* can be synchronized to rotate in opposite directions. A drive gear 18 fixed on a drive shaft 17*a* of a motor 17 engages with one of the rotor gears 15 via a driven gear 16. The motor 17 can be driven in both forward and reverse directions to forwardly or reversely rotate the rotors 8*a*, 8*b* via the drive gear 18, the driven gear 16 and the rotor gear 15.

To the rotation shaft 12*a* of the rotor 8*a* positioned at the upper side is fixed a cam 19 with a one-way clutch not shown interposed between the cam 19 and the rotation shaft 12*a*. The one-way clutch prevents the cam 19 from rotating when the rotors 8*a*, 8*b* rotate reversely (in a direction of arrow “b”). The outer surface of the cam 19 comprises, as shown in FIG. 4, an enlarging radius portion 19*a* in which the radius of the cam 19 enlarges gradually from an engaging position C and a maximum radius portion 19*b* in which the radius of the cam 19 becomes same from a position apart by about half circle from the engagement position C. In the engagement position C is formed an engaged portion 20, i.e., a step with which an engagement portion 22 of the press lever 9 that will be explained hereinafter is possible to engage and disengage.

The press lever 9, as shown in FIG. 4, is provided so as to rotate around a support shaft 9*a* and is urged to rotate in a clockwise direction in FIG. 4 by a spring not shown. On the lower surface of the front end portion of the press lever 9 is provided a pad 21 of elastic material such as urethane, enabling to press the multi-connected ampoule 4 without damaging it. On the back end portion of the press lever 9 is formed the aforementioned engagement portion 22 which is bent downwardly. The engagement portion 22 is possible to come into contact with the outer surface of the cam 19 due to an urging force of the spring not shown. During the rotation of the cam 19, when the engagement portion 22 comes into contact with the enlarging radius portion 19*a* from the engagement position C, the press lever 9 rotates around the support shaft 9*a* in a counterclockwise direction in FIG. 4, whereby the pad 21 approaches the multi-connected ampoule 4. Then, while the engagement portion 22 comes into contact with the maximum radius portion 19*b*, the pad 21 allows the second ampoule 4*b* to be positioned in a waiting position.

Whether or not the multi-connected ampoule 4 stops at the waiting position or whether or not it passes through the waiting position can be detected by the ampoule position detecting sensor 23 as shown in FIG. 2. The ampoule position detecting sensor 23 comprises the protrusion 24 urged by a spring not shown in a clockwise direction in FIG. 2 and a sensor portion 25 for detecting the rotation position of the protrusion 24. When the multi-connected ampoule 4 is fed by the belt conveyor 2, the protrusion 24 comes into contact with the outer surface of the first ampoule 4*a* and rotates to the position as shown in a doted line in FIG. 2, whereby an ON signal is outputted from the sensor portion 25. Thus, whether or not the multi-connected ampoule 4 stops at the waiting position is detected. When the first ampoule 4*a* passes through the waiting position, the protrusion 24 faces the connected portion between the first ampoule 4*a* and the second ampoule 4*b* and returns to the position as shown in a solid line in FIG. 2, whereby an OFF signal is once outputted from the sensor portion 25 and then an ON signal is outputted when the protrusion 25 comes into contact with the second ampoule 4*b*. Thus, whether or not the second ampoule 4*b* stops at the waiting position and whether or not the first ampoule 4*a* passes through the waiting position are detected. The reason why the mechanical sensor comprising the protrusion 24 and the sensor portion 25 is used as the ampoule position detecting sensor is that a reflecting or transparent type of sensor is difficult to detect a water-clear ampoule. Two ampoule position detecting sensors 23 are juxtaposed so that whether or not the multi-connected ampoule 4 is fed in a skewed condition can be also detected.

Figure 5:
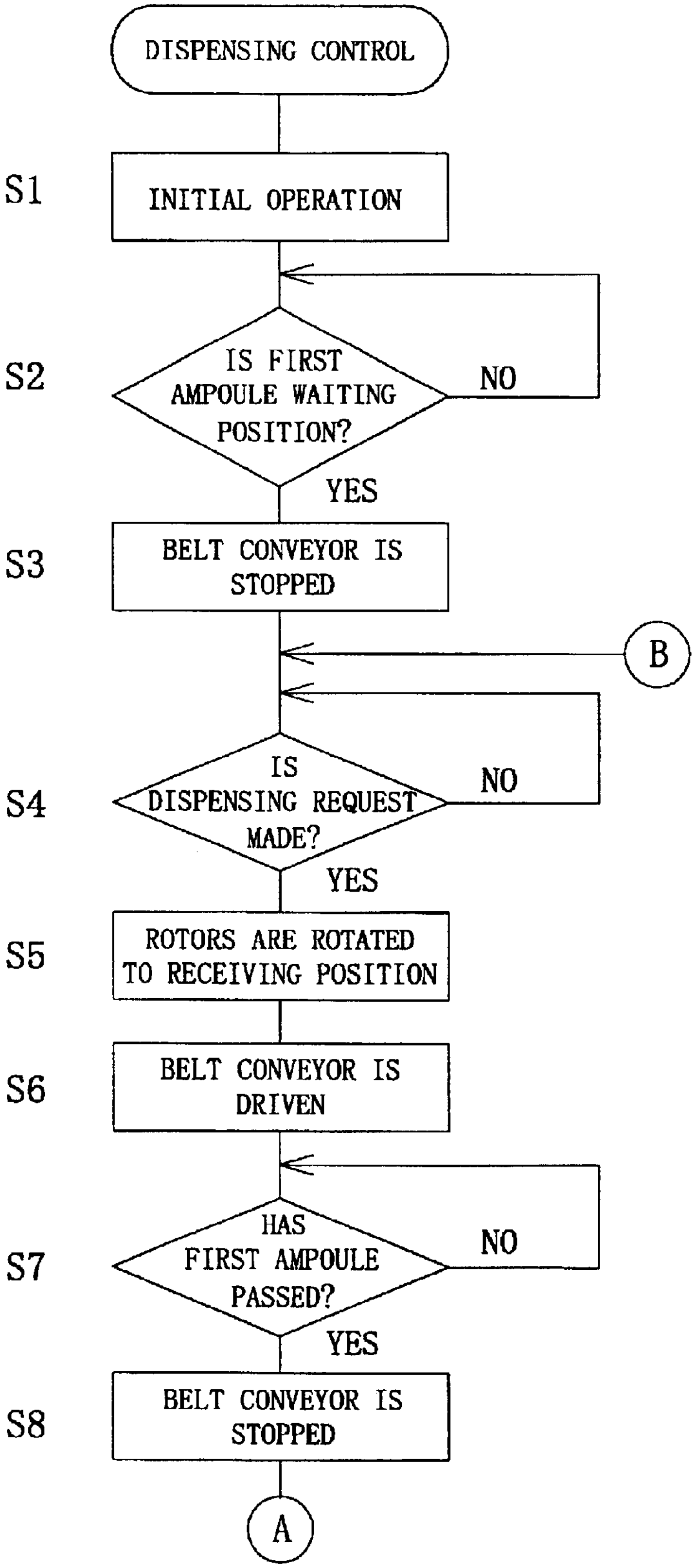
FIG. 5 is a flow chart showing the process of cutting off and dispensing the ampoules from the multi-connected ampoules.
Figure 6:
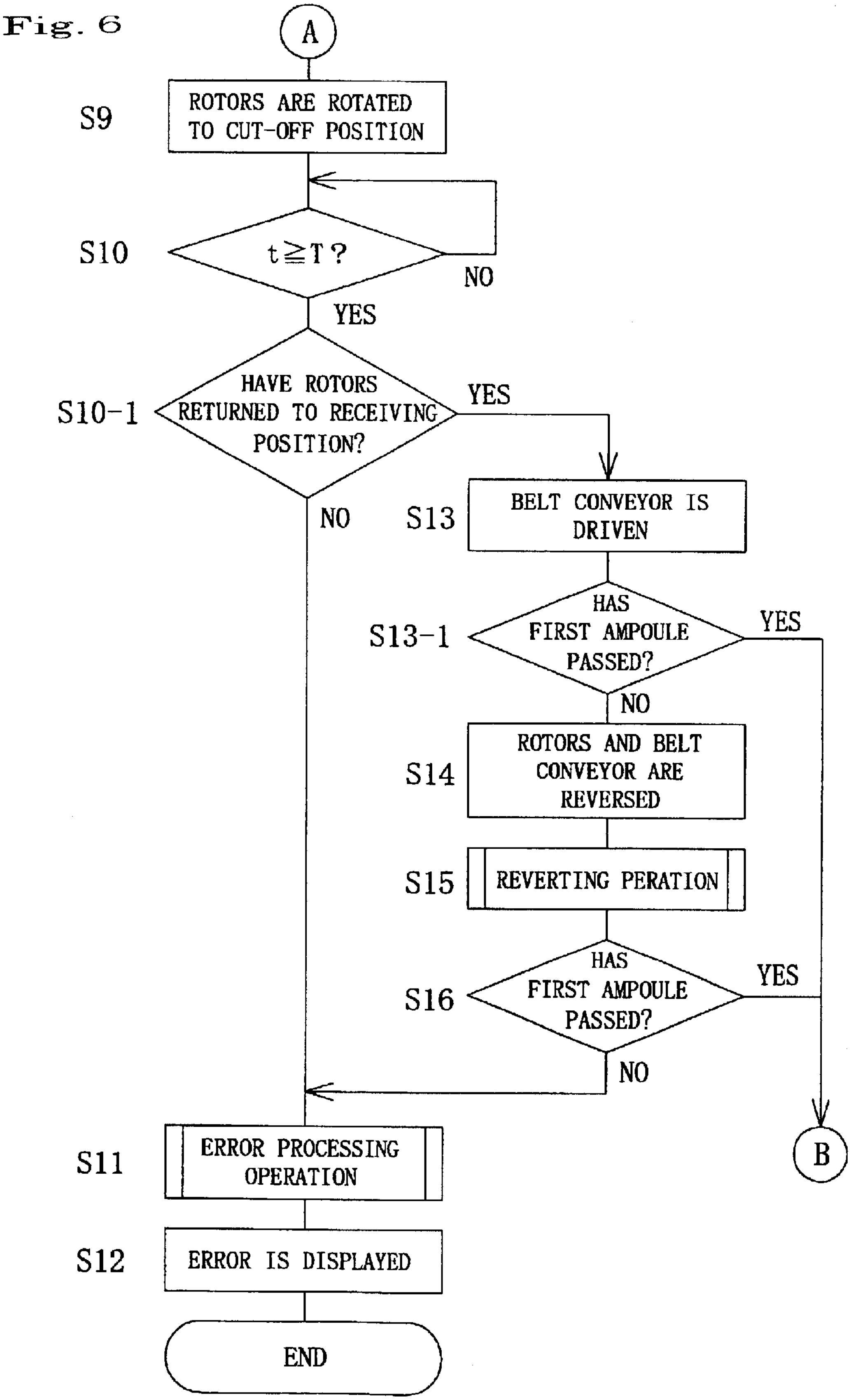
FIG. 6 is a flow chart to be connected to the flowchart of FIG. 5.

Next, operation of the multi-connected ampoule dispensing apparatus will be explained in accordance with the flowchart as shown in FIG. 5.

When powered up, an initial operation is executed (step S1), in which for a predetermined time the rotors 8*a*, 8*b* are reversely rotated and the feed direction of the belt conveyor 2 is reversed, and then the rotors 8*a*, 8*b* are forwardly rotated and the feed direction of the belt conveyor 2 is returned to an original state. Based on the detected signal of the ampoule position detecting sensor 23, it is decided whether or not the first ampoule 4*a* of the multi-connected ampoule 4*a* is positioned at the waiting position (step S2). If the first ampoule 4*a* is not positioned at the waiting position, driving the belt conveyor 2 is continued, while if positioned, the belt conveyor 2 is stopped (step S3).

Consequently, it is decided whether or not a dispensing request is made (step S4). The dispensing request is made in accordance with medicine data included in the prescription information. If the dispensing request is made, the motor 17 is driven to rotate the rotors 8*a*, 8*b* to the receiving position (FIG. 3A). Then, the belt conveyor 2 is driven to feed the multi-connected ampoule 4 to the rotors 8*a*, 8*b* (step S6). The feed quantity by the belt conveyor 2 is decided based on the size (outer diameter) of the ampoule and the diameter of the rotor (radius of curvature of the receiving surface). Here, based on the detected signal of the ampoule position detecting sensor 23, it is decided whether or not the first ampoule 4*a* has passed through the waiting position (step S7). If it is decided that the first ampoule 4*a* has passed, the belt conveyor 2 is stopped (step S8). Thus, the first ampoule 4*a* is positioned at the receiving position as shown in FIG. 3A.

Figure 3B:
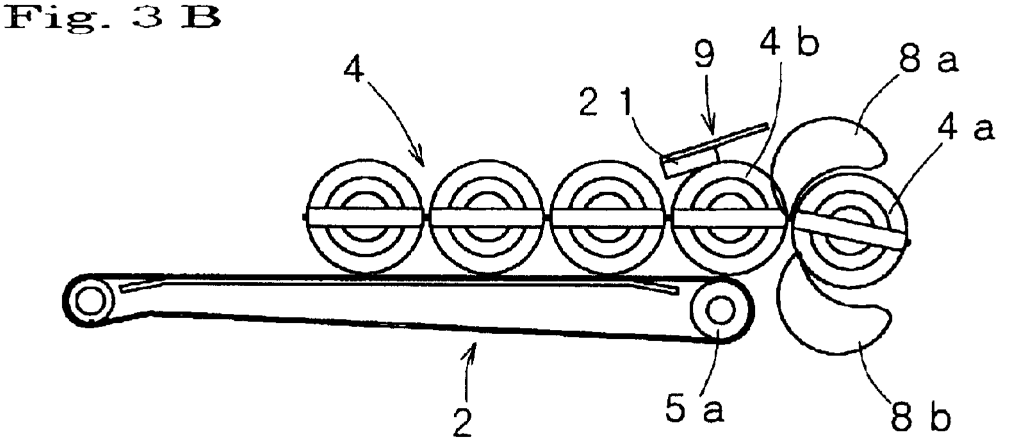
Figure 3C:
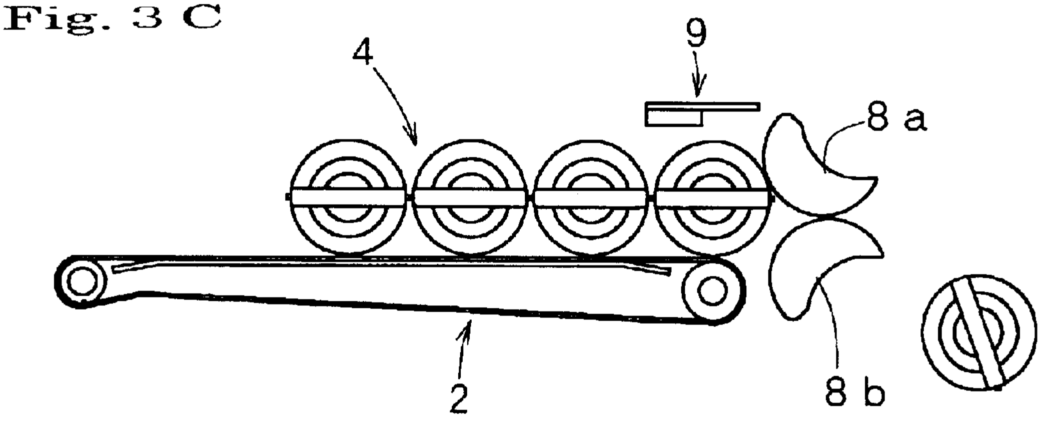

Then, the motor 17 is driven as the conveyor 2 is driven to feed the multi-connected ampoule 4 (by 5 mm in the present embodiment) so that the rotors 8*a*, 8*b* are rotated from the receiving position to the cut-off position as shown in FIG. 3B (step S9). In connection with the rotational operation of the rotors 8*a*, 8*b*, the cam 19 allows the press lever 9 to pivot and allows the pad 21 to come into contact with the second ampoule 4*b* positioned at the waiting position. Thus, the second ampoule 4*b* is surely fixed at the waiting position by means of the roller 5 of the belt conveyor 2, the outer surface of the upper rotor 8*a* and the pad of the press lever 9. As a result, when the first ampoule 4*a* is cut off by the cutting edges 10 of the rotors 8*a*, 8*b*, it is prevented that the multi-connected ampoule 4 is shifted, particularly skewed due to the impact. Thus, it is possible to accurately surely cut off the first ampoule 4*a*.

A timer is started when the rotors 8*a*, 8*b* are rotated from the receiving position. At the time when the elapsed time "t" of the timer becomes a presetting time (setting time T: 2 seconds in the present embodiment) (step S10), it is decided whether or not the rotor 8*a*, 8*b* are returned to the receiving position (step S10-1). The setting time T is a time required for the rotors 8*a*, 8*b* to rotate from the receiving position to the cut-off position and return to the receiving position again in a normal ampoule cut-off operation.

If the rotors 8*a*, 8*b* have not returned to the receiving position even when the elapsed time "t" becomes the setting time T, it is decided that any problems such as jam of ampoule occur. Thus, an error processing operation is conducted (step S11), in which the rotors 8*a*, 8*b* are reversely rotated and the feed direction of the belt conveyor 2 is reversed. At this time, the cam 19 does not rotate due to the operation of the one-way clutch and the press lever 9 retains the condition apart from the waiting position. Then, the error display is executed (step S12) and the operation of each member is stopped so that the ampoule cutting-off operation is finished. Thus, the reverse operation of the rotors 8*a*, 8*b* and the belt conveyor 2 is executed before stopping the cut-off operation, which enables the jammed ampoule to be easily taken out.

If the rotors 8*a*, 8*b* have returned to the receiving position when the elapsed time "t" becomes the setting time T, it is decided that the first ampoule 4*a* is successfully cut off. Then, the belt conveyor 2 is driven (step S13) and it is decided whether or not the ON signal is outputted again from the ampoule position detecting sensor 23, i.e., whether or not next first ampoule 4*a* has passed the waiting position (step S13-1).

If the next first ampoule 4*a* has passed at step S13-1, the flow is returned to step S4 to repeat the same process as described above. And if the number of the dispensed ampoule reaches the ampoule number to be dispensed in the prescription information, the dispensing process is completed.

If the next first ampoule 4*a* has not passed yet, it is decided that a problem that the next first ampoule 4*a* can not be move to the receiving position occurs. Then, the rotors 8*a*, 8*b* are reversely rotated by one rotation and the feed direction of the belt conveyor 2 is reversed (step S14). At this time, the cam 19 does not rotate due to the operation of the one-way clutch and the press lever 9 retains the condition apart from the waiting position. Consequently, a reverting operation is conducted (step S15), in which the rotors 8*a*, 8*b* are stopped at the receiving position and the belt conveyor 2 is forwardly driven. Due to the reverting operation, if the ON signal is outputted from the ampoule position detecting sensor 23 (step S16), the flow is returned to step S4 to repeat the same process as described above. And if the number of the dispensed ampoule reaches the ampoule number to be dispensed in the prescription information, the dispensing process is completed. On the other hand, the ON signal is not outputted from the ampoule position detecting sensor 23 (step S16) in spite of the reverting operation (9), the error display is executed (step S12) and the ampoule cutting-off operation is finished.

In the aforementioned embodiment, although the press lever 9 as positioning means is mechanically synchronized with the rotors 8*a*, 8*b* using the cam 19, a drive unit for the press lever 9 may be provided so as to electrically synchronize with the drive unit of the rotors 8*a*, 8*b*. In this case, the press lever 9 can be driven to engage with the multi-connected ampoule 4 only when cutting off the first ampoule 4*a* as shown in FIG. 3B and to disengage from the multi-connected ampoule 4 immediately after cutting off the first ampoule 4*a* as shown in FIG. 3*c*.

Figure 7A:
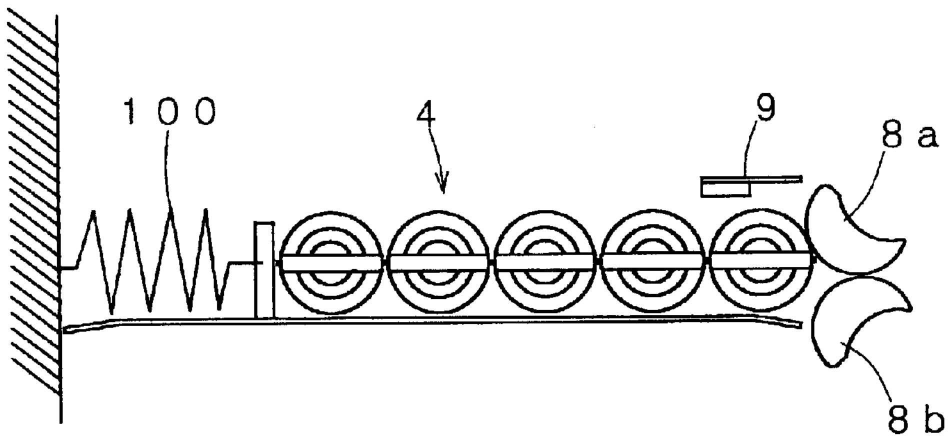
FIGS. 7A–7C are schematic views showing an another examples of the dispensing means.
Figure 7B:
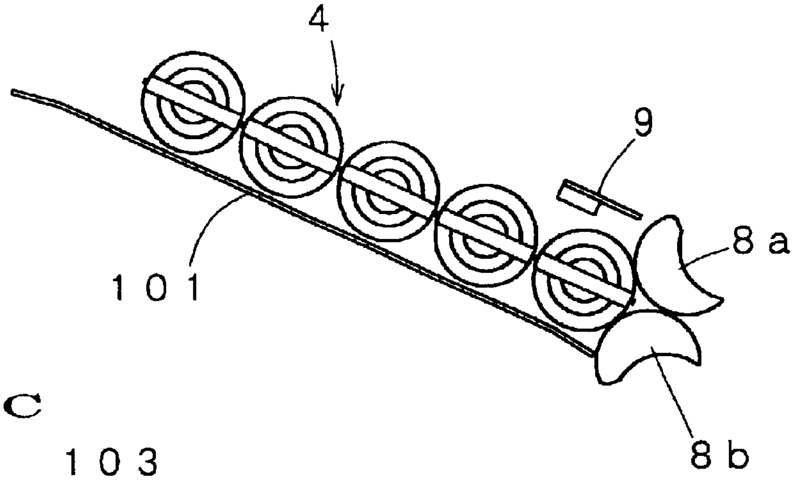
Figure 7C:
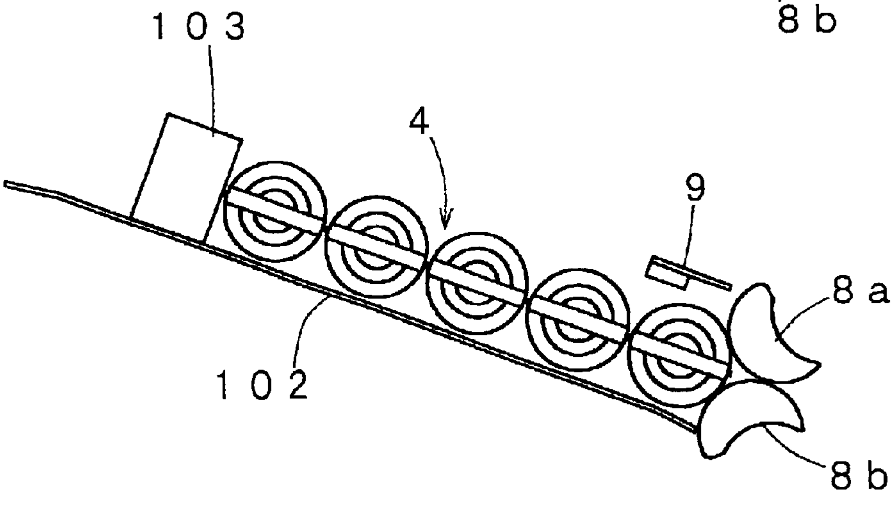
Figure 8:
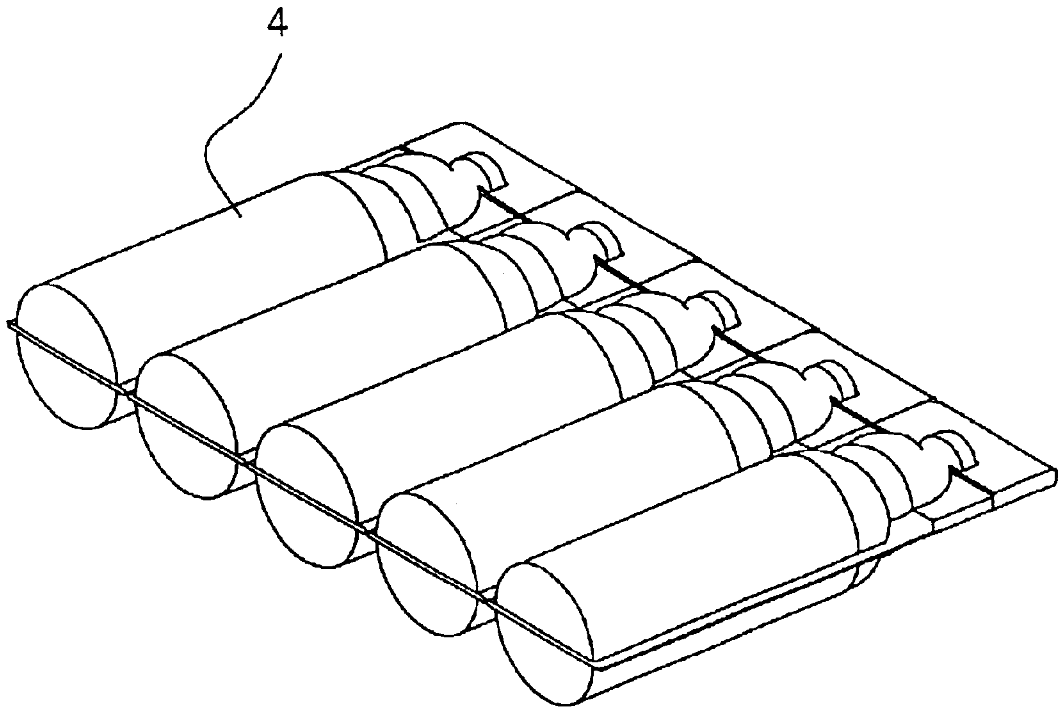
FIG. 8 is a perspective view of an example of the multi-connected ampoule.

Further, although the belt conveyor 2 allows the multi-connected ampoule 4 to be fed in a substantially horizontal direction, it is also possible, for example, to use a spring 100 as shown in FIG. 7A, a sloped surface 101 as shown in FIG. 7B, and a sloped surface 102 and a weight 103 as shown in FIG. 7C. In FIG. 7C, an angle of the sloped surface 102 can be smaller than that of the sloped surface 101 in FIG. 7B, enabling to reduce a space in a vertical direction to be occupied.

As clear from the above explanation, according to the present invention, as the dispensing means comprises the pair of rotors having the substantially C shape of cross section and the positioning means is driven so as to synchronize with the rotation of the rotors so that the shift of the second ampoule is prevented, it is possible to reliably conduct the cut-off of the ampoule in spite of compact construction.

Although the present invention has been fully described by way of the examples with reference to the accompanying drawing, it is to be noted that various changes and modifications will be apparent to those skilled in the art. Therefore, unless such changes and modifications otherwise depart from the spirit and scope of the present invention, they should be construed as being included therein.

What is claimed is:

1. A multi-connected ampoule dispensing apparatus, comprising:

feed means for feeding a multi-connected ampoule comprising a plurality of ampoules of synthetic resin, the feed means feeding the first ampoule from a waiting position to a dispensing position and feeding a second ampoule adjacent to the first ampoule to the waiting position;

dispensing means for cutting off and dispensing ampoules in order from a first ampoule positioned at one end of the multi-connected ampoule, the dispensing means comprising a pair of rotors each of which has a substantially C shape of cross section and is formed with a cutting edge on one side edge, the rotors being disposed in a vertical direction with a predetermined distance, the rotors being synchronized to rotate from a receiving position, in which the cutting edges separate from each other, to a cut-off position, in which the cutting edges close with each other, and return to the receiving position, whereby in the receiving position the rotors can receive the first ampoule positioned at the dispensing position and then in the cut-off position cut off the first ampoule to dispense it; and positioning means for positioning the second ampoule in the waiting position when the dispensing means cut off the first ampoule, the positioning means being synchronized with the dispensing means.

2. A multi-connected ampoule dispensing apparatus as in claim 1, wherein the feed means comprise a belt conveyor, and wherein the positioning means comprises a press lever which positions the second ampoule in the waiting position together with the belt conveyor and the upper rotor when the rotors rotate to the cut-off position.

3. A multi-connected ampoule dispensing apparatus as in claim 1, further comprising ampoule position detecting means for detecting whether or not the first ampoule passes through the waiting position, and whereby when the ampoule position detecting means detects that the first ampoule has passed through the waiting position, the rotors are rotated so that the positioning means positions the second ampoule in the waiting position and the cutting edges cut off the first ampoule.

4. A multi-connected ampoule dispensing apparatus as in claim 3, wherein when the ampoule position detecting means can not detect that the first ampoule has passed through the waiting position in spite that the feed means feeds the multi-connected ampoule, the rotation direction of the rotors and the feed direction of the feed means are reversed.

5. A multi-connected ampoule dispensing apparatus as in claim 1, further comprising rotor position detecting means for detecting whether or not the rotors is positioned in the receiving position, and whereby when the rotor position detecting means can not detect that the rotors rotate from the receiving position and return to the receiving position again, the rotation direction of the rotors and the feed direction of the feed means are reversed.

* * * * *